United States Patent [19]

Oshima et al.

[11] Patent Number: 5,247,610
[45] Date of Patent: Sep. 21, 1993

[54] METHOD AND APPARATUS FOR GENERATING GRAPHICS

[75] Inventors: Sayuri Oshima, Kanagawa; Akira Nakajima, Tokyo; Akira Naito, Kanagawa; Yasumasa Matsuda, Tokyo; Hirohide Endo, Saitama; Michihiro Mese, Kanagawa; Tsukasa Yamauchi, Kanagawa; Toshiharu Kawasaki, Kanagawa; Hiroyuki Kumai, Kanagawa; Shigeyuki Nishitani, Kanagawa; Yukie Yamazaki, Yokohama, all of Japan

[73] Assignee: Hitachi, Ltd., Tokyo, Japan

[21] Appl. No.: 953,019

[22] Filed: Sep. 29, 1992

Related U.S. Application Data

[63] Continuation of Ser. No. 493,800, Mar. 15, 1990, abandoned.

[30] Foreign Application Priority Data

Mar. 17, 1989 [JP] Japan .................................. 1-63623
Sep. 29, 1989 [JP] Japan .................................. 1-251882

[51] Int. Cl.$^5$ ............................................ G06F 15/62
[52] U.S. Cl. ..................................... 395/135; 395/161
[58] Field of Search ............... 395/155, 161, 133, 135, 395/152; 358/93; 364/474.22, 474.24

[56] References Cited

U.S. PATENT DOCUMENTS

| | | | |
|---|---|---|---|
| 4,868,766 | 9/1989 | Oosterholt | 364/522 |
| 4,984,180 | 1/1991 | Wada et al. | 364/474.24 |
| 5,003,498 | 3/1991 | Ota et al. | 364/522 |
| 5,010,502 | 4/1991 | Diebel et al. | 364/474.24 |

FOREIGN PATENT DOCUMENTS 0205683  6/1985  European Pat. Off. .

OTHER PUBLICATIONS

Systems, Computers, Controls, vol. 12, No. 2, Mar. 1981, pp. 45-54.

*Primary Examiner*—Heather R. Herndon

[57] ABSTRACT

A graphic generating apparatus ane method in comprising a plurality of reference figures are stored and a plurality of figure parts are stored. One of the stored reference figures is selected and displayed and at least one of the plurality of figure parts is selected.

36 Claims, 12 Drawing Sheets

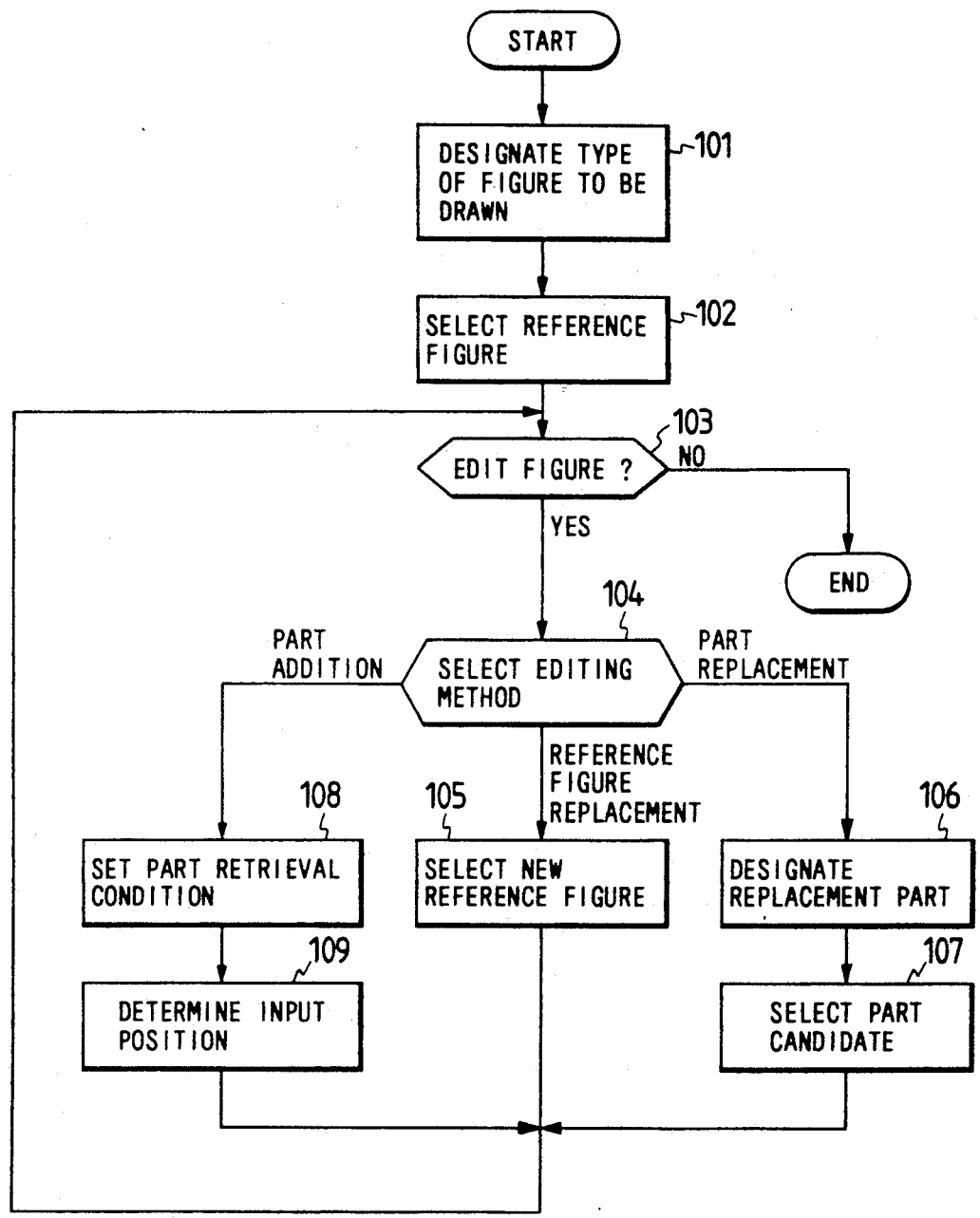

FIG. 4(a)
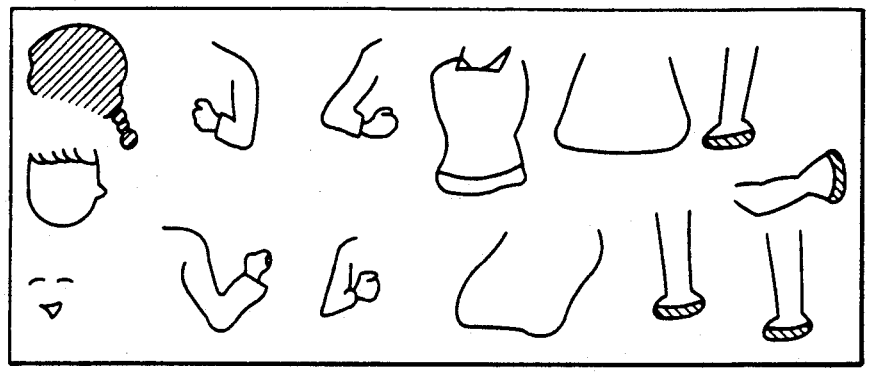
FIG. 4(b)    FIG. 4(c)    FIG. 4(f)
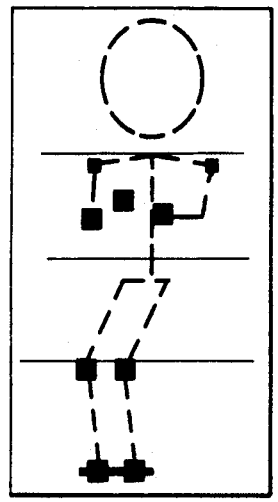   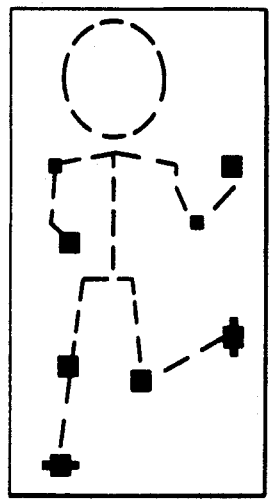   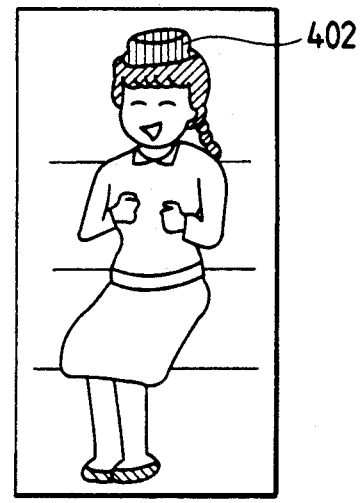
FIG. 4(d)    FIG. 4(e)    FIG. 4(g)
      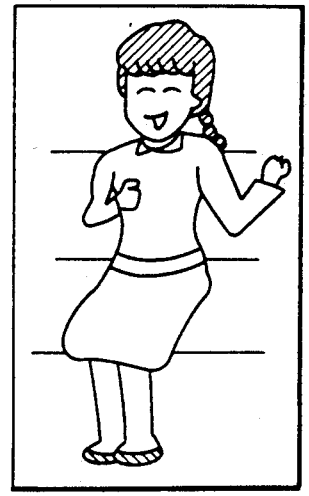

FIG. 9
| PRE-CONVERSION KEYWORD AREA | POST-CONVERSION KEYWORD AREA |
|---|---|
| MANY | 4 |
| A FEW | 2 |
| VERY FEW | 1 |
| | |
FIG. 10(a)
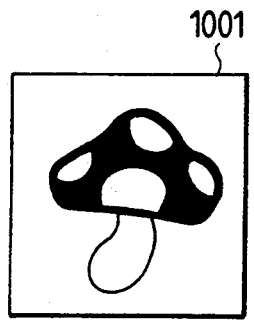
FIG. 10(b)
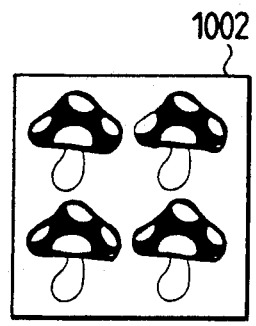
FIG. 10(c)
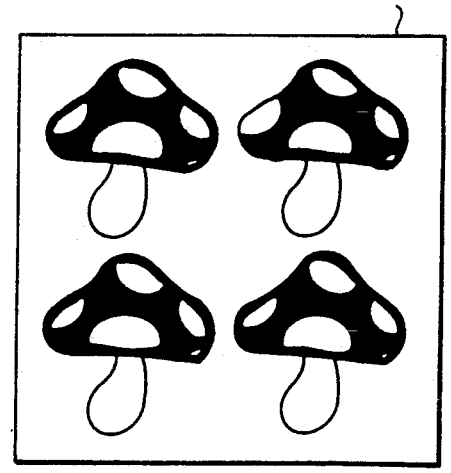

METHOD AND APPARATUS FOR GENERATING GRAPHICS

This application is a continuation of application Ser. No. 493,800, filed on Mar. 15, 1990, now abandoned.

BACKGROUND OF THE INVENTION

The present invention relates to a method and an apparatus for generating figures and other graphic representations.

With conventional graphics technology, it was possible to input circles, rectangles, straight lines and other geometric figures and to delete, move or otherwise edit these figures entered. An example of the prior art in this area is found in Japanese Patent Application Laid-Open No. 6249477. This invention was typically embodied by a graphics generating apparatus comprising a structure storage device which stores the structure of each of multiple parts forming an object, a partial figure storage device which stores multiple figures of each part, and a figure generating device which interpolates for display the object in accordance with one of the figures stored in the partial figure storage device. Given these devices, it was possible to generate a new figure based on an entered figure and a figure retrieved from the partial figure storage device.

With the above-described prior art in this area, the part structure storage device and the part figure storage device were used only to modify figures already generated and stored. That is, these devices did not allow for retrieval of a part figure suitable for any figure stored in the figure storage device. So it was necessary to select and specify beforehand a reference figure, which complicated the operating procedures. In addition, the part structure storage device contained-the structure for each part alone. The absence of information on multiple parts amenable to combination made it impossible to combine multiple parts.

SUMMARY OF THE INVENTION

Therefore, it is an object of the present invention to provide a method and an apparatus whereby there are supplied a large number of part figures which are searched for those figures that fit a reference figure selected.

In accordance with a feature of the present invention, the figures thus retrieved are combined to generate a desired figure easily, which boosts operability.

In accordance with another feature, in modifying part figures for combination, only those part figures that are suitable for modification are selected, not those totally unrelated to one another. This feature improves the quality of the modification involved.

The object of the invention is achieved by providing a number of suitable devices: a input device which inputs character strings and figures according to input instructions; a device which displays these character strings and figures; a device which enables selection of a figure having a reference point in the graphics input device capable of modifying the character strings and figures generated; a device for positioning part figures for alignment with the selected reference figure; and a device for selecting the part figures to be positioned.

According to a feature of the invention a device is additionally provided enabling modification and location of the part figures to be positioned in alignment with the reference figure. The term "part" or "parts" in the context of the present invention refers to such geometrical figures as circles and rectangles, and figures made up of combinations of straight lines, splines, trace curves and other graphic elements. One discrete part may be treated as a figure; multiple parts may also be combined to be handled as a single figure.

In accordance with the present invention, already generated figures are stored as the data on part figures obtained by dividing collective figures such as splines and trace lines into parts. These parts constitute the part figures. The retrieval data by which to call these part figures is also stored. A desired part figure is retrieved from the storage means in accordance with the keyword for the part or with the reference point or reference figure corresponding to the part figure to be called. This retrieval and call operation is carried out as follows. First, a desired part is selected from the storage means using the keyword corresponding to the part or as per the reference point or reference figure for the part figure to be called. The selected part is then read into a figure generation area in storage. In addition, the entered keyword is also converted according to predetermined rules. The called part figure is located in accordance with the reference point or reference figure in use, or modified as per the size and shape of the reference figure.

The above and other objects, features and advantages of the present invention will become more apparent from the following description when taken in connection with the accompanying drawings which show, for the purposes of illustration only, several embodiments in accordance with the present invention.

BRIEF DESCRIPTION OF THE DRAWINGS

FIG. 1 is a flowchart outlining the steps to use the preferred embodiment of the present invention.

FIGS. 4(a)-4(g) are view showing typical part candidates, structure lines, and the figures that are derived from these graphic components;

FIG. 9 is a view depicting the arrangement of the keyword conversion table for use with the embodiment;

FIGS. 10(a)-10(c) are views showing an example that applies when a numeric value is given as a keyword;

DETAILED DESCRIPTION OF THE PREFERRED EMBODIMENTS

Figure 2A:
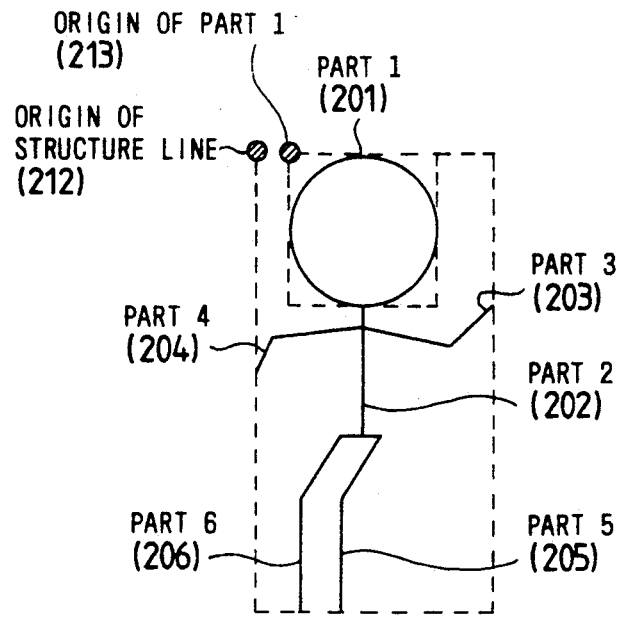
FIGS. 2(a) and 2(b) show a typical structure line and the data structure thereof, respectively.

Referring now to the drawings, wherein like numerals are utilized to designate like parts throughout the several views, FIG. 1 is a flowchart showing the steps to generate a figure in an embodiment of the invention. As an example, a figure such as the one shown in FIG. 4 is to be generated. In this case, a figure type is first designated in step 101. A figure type is the type of the figure to be drawn, representative of such attributes as whether or not the figure is a human being whose structure line forms a reference line, what kind of person the figure is supposed to depict, etc. In the case of in FIG. 4(d), the figure type to be designated is a human being, which is defined as a "girl."

In step 102, a reference figure is selected. A reference figure is a figure in reference to which multiple part figures are determined in terms of position and size. Where the figure type is a human being, a structure line representing the human skeleton such as one in FIG. 4(b) or FIG. 4(c) is used. The same person may take on various shapes, as depicted in FIGS. 4(d) and (e). Therefore, multiple structure lines are provided for the definition "girl." In this case the multiple structure lines are displayed in a part candidate display area 502 of FIG. 5, to be described later, for selection by the user.

Structure line data is divided into a plurality of components. Each component is a body of data defining the type, coordinates and size of a corresponding part. In accordance with the structure line data, the part figure data in FIG. 4(a) is searched for appropriate figures. The retrieved figures are combined to make up a figure such as the one in FIG. 4(d).

The figure thus generated is edited, according to the present invention, in three ways in addition to basic graphic editing. The three ways are: reference figure replacement, part replacement, and part addition. Reference figure replacement is resorted to when, for example, the figure in FIG. 4(d) is to be modified into FIG. 4(e). In this case, a new structure line of FIG. 4(c) is selected in step 105. The part figures corresponding to the new structure line data are retrieved and combined.

Part replacement is utilized when a designated part is to be replaced with another part. When a left arm 401 in FIG. 4(d) is designated in step 106, a part figure that is the left arm of a girl is retrieved and displayed in the part candidate display area 502 of FIG. 5 on a screen. In this case, there are two conditions for retrieval: a part type "left arm" and a figure type "girl." Then in step 107, the user selects a part candidate, which replaces the designated part figure. The result of this part replacement process is illustrated in FIG. 4(g).

As its name implies, part addition is a process used where a new part is to be added, to be explained later. When retrieval conditions (i.e., keyword for retrieval) are set in step 108, the corresponding part is retrieved accordingly. In step 109, an input position is determined. FIG. 4(f) depicts the result obtained after a keyword "hat" is given.

Figure 2B:
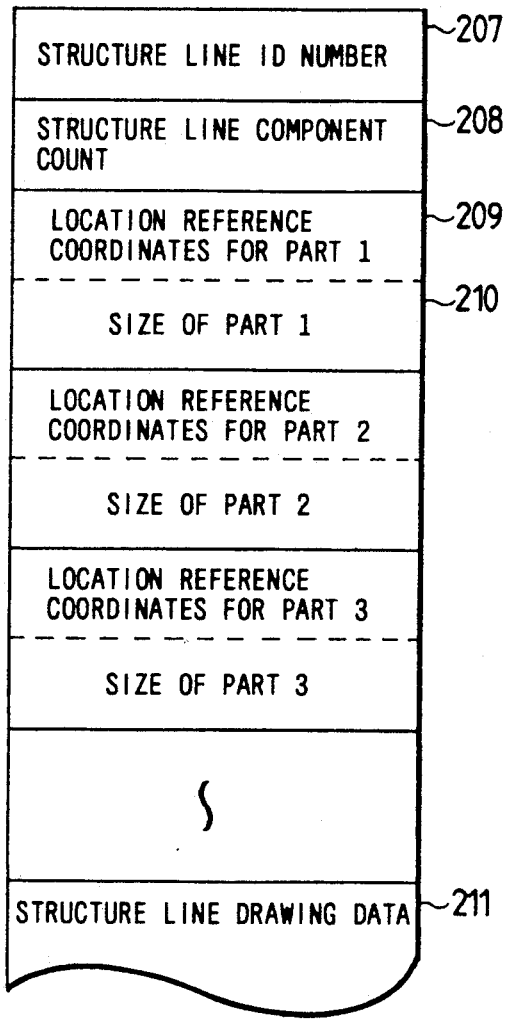

A description outlining the data structure of reference figures and the way target figures are searched for and retrieved according to the present invention is now provided. Reference figures are figures in reference to which part data in the part data storage is located. These figures may be ordinary figures such as points and circles; again, reference figures may be a structure line showing the skeleton of human beings as described above. FIGS. (a) and (b) of FIG. 2 show a structure line and its data structure. The structure line is in fact made up of multiple components. In the example of FIG. 2(a), structure line is formed by six components, from part 1 (201) to part 6 (206). The data on the structure line, as depicted in FIG. 2(b), comprises a structure line identification number area 207, a structure line component count area 208, a location reference coordinate area 209 for each part paired with a part size area 210 for each part, and a structure line drawing data area 211, in that order. The location reference coordinate area 209 stores coordinates of an origin for each part relative to an origin 212 of the structure line which is (0, 0). The part size area 210 stores the size of each part. If the retrieved part figure is different in size from the value in the part part size area 210, the part figure is magnified or contracted to meet the value in the part size area.

Figure 3:
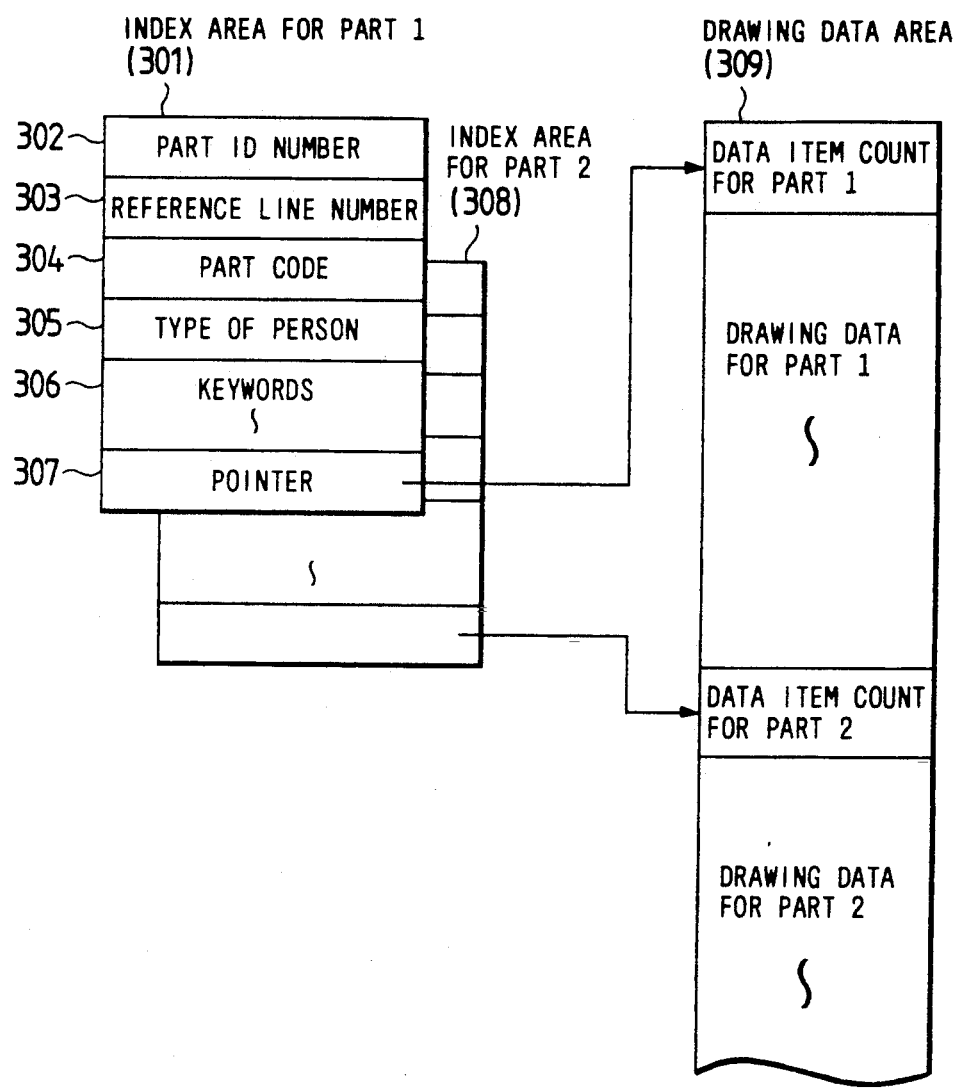
FIG. 3 is a view depicting the data configuration for each part figure.

When a figure type is designated and a structure line selected for figure generation or reference figure replacement, the figure type and the structure line identification number 207 in the structure line data are used as keys by which to search for and retrieve a suitable part from the part data. The part retrieved to fit the part size specified in the area 210 is modified accordingly and located at the point given by location reference coordinates specified in the area 209. The above process is performed on all components of the structure line. By combining multiple parts, it is possible to execute figure generation or reference figure conversion. The data structure of actual part figures as well as the way in which to retrieve desired figures given a key or keys will be described as shown in FIG. 3, part figure data is divided into two portions, one placed in an index area 301 and the other in a drawing data area 309. One index area corresponds to one part. The index area 301 comprises: a part ID number area 302 which stores an ID number unique to each part; a structure line number area 303 indicating the number of a corresponding structure line; a part code area 304 giving the part number on the structure line; a person type area 305 denoting the type of the person figure for which the current part is to be used; a keyword area 306 storing keywords by which to retrieve this part; and a pointer area 307 pointing to the address of the corresponding data in the drawing data area 309. The drawing data area 309 stores drawing data necessary for displaying or printing each part.

When a condition is set as a key for retrieval during figure generation, reference figure replacement or part addition, the system searches for and retrieves a part figure that matches the index area 301 in retrieval condition. The system then reads the drawing data pointed to by the pointer area 307 of the index area 301 before completing the part retrieval operation.

Figure 5:
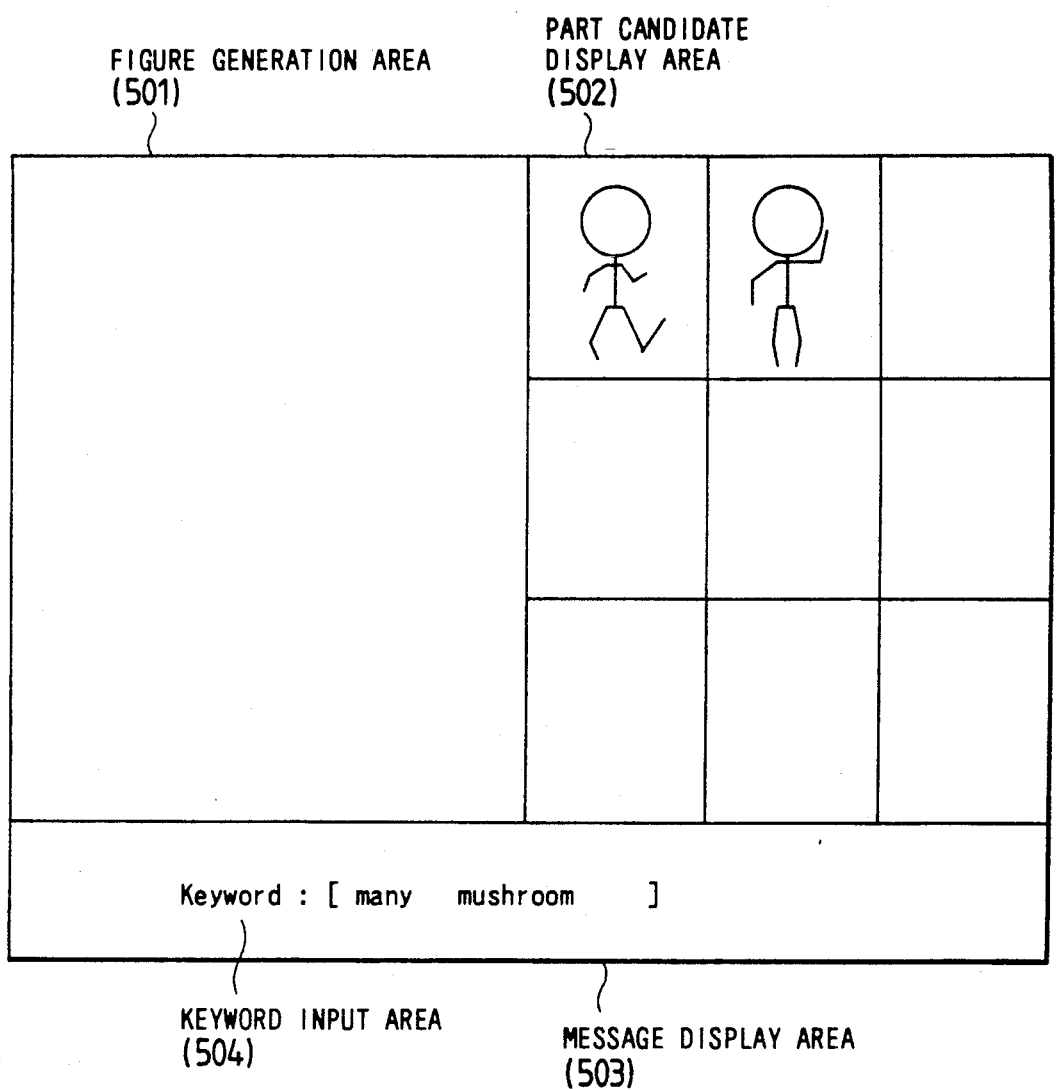
FIG. 5 is a view illustrating the screen configuration for part display and selection on the display unit of the embodiment.

FIG. 5 shows the candidate display screen, already mentioned, for displaying reference figures and part figures. The screen is split into three areas: a figure generation area 501 displaying the newly generated figure; a part candidate display area 502 showing part candidates; and a message display area 503 indicating messages for help and guidance purposes as well as keywords. This arrangement makes it possible for the user to select a desired part while watching the target figure to be created and part candidates at the same time.

Figure 6:
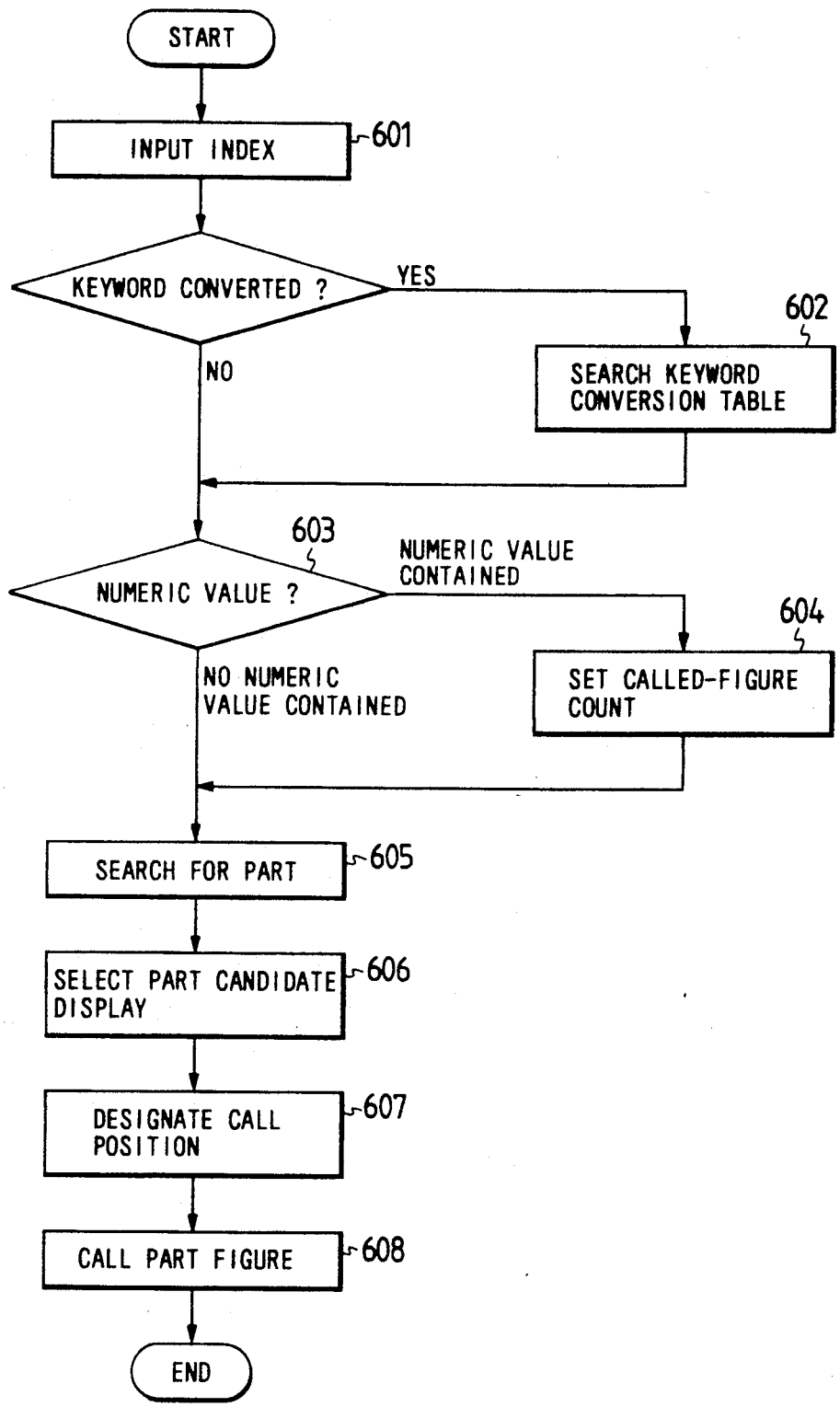
FIG. 6 is a flowchart depicting the steps to retrieve figures according to keywords.

Part figures are retrieved using keywords in cases of part addition as described below. FIG. 6 is a flowchart detailing step 108, shown in FIG. 1, to set conditions by which to retrieve a part and step 109, also in FIG. 1, to determine the figure input position. In step 601 (for index input), the input of keywords is accepted. The entered keywords are displayed in a keyword input area 504 of FIG. 5 within the message display area 503. Each part is associated in advance with its own keywords that are stored in the keyword area 306 of the index area 301 for the respective parts.

Where it is necessary to convert the input keywords into different keywords, the operation is carried out in step 602 in which a keyword conversion table is searched for conversion purposes. In step 603 (for numerical value judgment), a numerical value may be judged to be contained in a keyword. In that case, the value is identified and the number of figures to be called is set in step 604 (for called-figure count setting). In step 605 (for part retrieval), the entered keywords are compared with those of each part found in the keyword area 306. When the keywords of some parts are matched, these parts are retrieved and displayed as part candidates in the part candidate display area 502 in step 606 (for part candidate display selection).

In step 607 (for call position designation), the call position for the selected position is designated. Then in step 608 (for part figure calling), the data on the designated part is displayed in the figure generation area 501.

With the above procedures executed, desired part figure data is called using any keywords. Further applications of the invention such as those presented below are made available by varying the way keywords are given, or by calling multiple parts based on a given keyword.

Figure 7C:
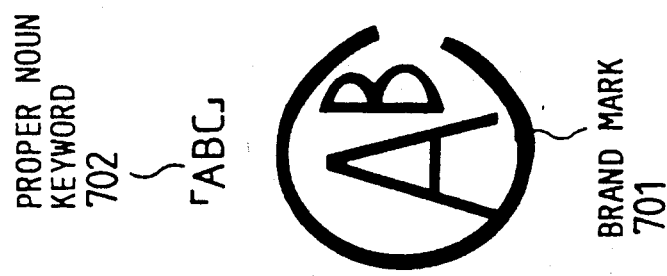
FIGS. 7(a)-7(c) are views for explaining what happens when proper nouns are given as keywords.
Figure 7B:
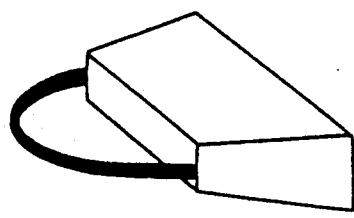
Figure 7A:
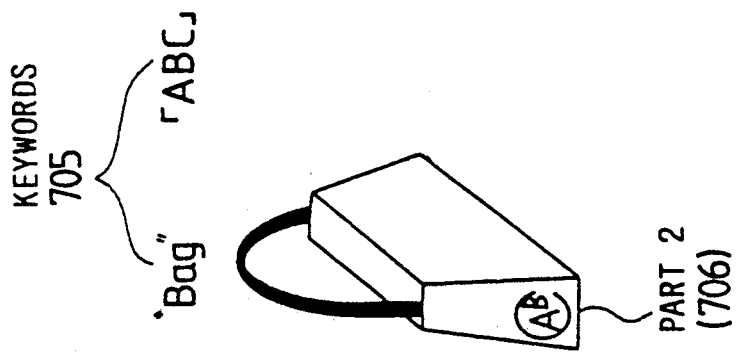

In the example of FIG. 7(a), a brand mark 701 representing a registered trademark or brand name is stored as a part figure# with a corresponding proper noun keyword 702 also stored. If the proper noun keyword 702 is found among keywords 705 entered in step 601 (for index input), the entered keywords 705 are divided into, say, a common noun keyword 703, as shown in FIG. 7(b) and the proper noun keyword 702 in step 605 (for part retrieval). The brand mark 701 retrieved from the proper noun keyword 702 is displayed overlapping with figure part 1 (with numeral 704) that was retrieved from the common noun keyword 703. This results in figure part 2 (with numeral 706) having characteristics indicating the registered trademark and brand name, as shown in FIG. 7(c).

Figure 8:
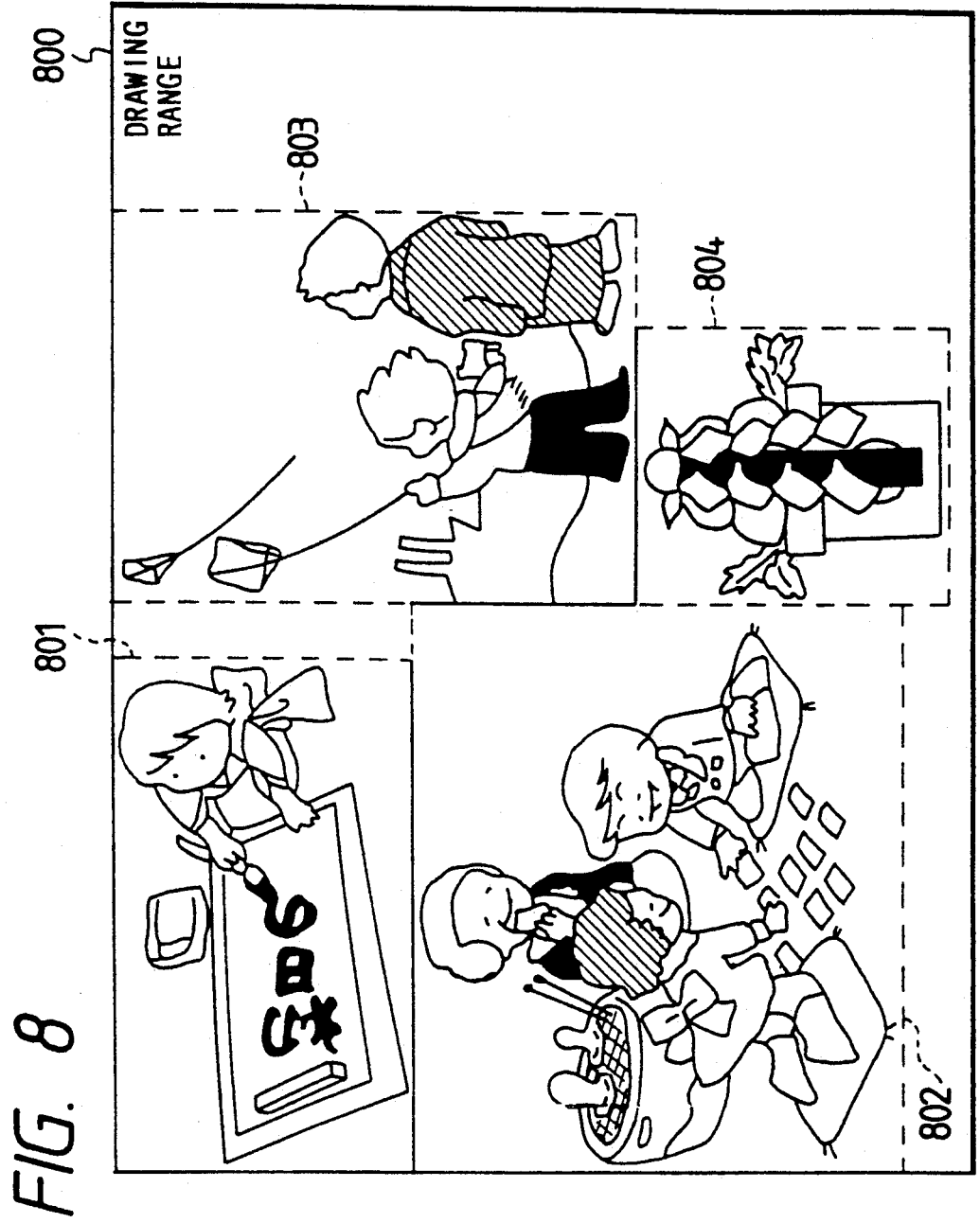
FIG. 8 is a view for explaining what happens when a season name is given as a keyword.

Keywords for each part may include era names and seasons, such as the Edo Period and the New Year, or region and country names such as the United States. These keywords make it possible to retrieve all parts associated with, say, a particular era or region. An example of supplying keywords in this manner is shown in FIG. 8. The figure shows that four parts, 801 through 804, are arranged in a way that they do not overlap with one another within a drawing range 800. These parts have been retrieved according to the keyword "New Year." The location of each part may be determined as desired by an operator.

Entered keywords may be converted to other keywords that have fuzzy meanings. This is accomplished by providing a keyword conversion table shown in FIG. 9. This table comprises a pre-conversion keyword area 901 and a post-conversion keyword area 902. The keywords in the preconversion keyword area 901 are associated with their counterparts in the post-conversion keyword area 902. For example, if a keyword "many" is entered, the preconversion keyword area 901 in the keyboard conversion table is searched for that keyword in step 602 (for keyword conversion table retrieval). When found, the keyword is associated with its corresponding character string in the post-conversion keyword area 902. With the conversion completed, the next operation commences.

By handling the keyword conversion table in a suitable manner, the user can register any keywords desired. When registering a keyword, all the user has to do is to prepare the yet-to-be converted keyword and its counterpart after conversion, and place them in the pre-conversion keyword area 901 and post-conversion keyword area 902, respectively.

There will now be explained the case in which the keyword entered is a numerical value. In the flowchart of FIG. 6, whether or not the input keyword contains a numerical value is judged in step 603 (for numerical value judgment). If the keyword is judged to contain a numerical value, a called-figure count is set in step 604 (for called-figure count setting) according to the value. Where the above-mentioned keyword "many" was entered, the called-figure count is set to 4. The value of 4 was previously obtained by associating the keyword with its counterpart "4" in the post-conversion keyword area 902 in step 602 (for keyword conversion table retrieval). Retrieval of parts and displaying of part candidates are performed in the same manner as with ordinary keywords. The difference is that in step 608 (for part figure calling), the called figure is copied as many times as the called-figure count designated. In the example of FIG. 10, giving a "mushroom" as a keyword generates a single mushroom figure as shown in FIG. 1001. If a "4" and a "mushroom" are given together as keywords, the called figure is copied automatically four times. The result is FIG. 1003 showing four mushrooms. In this case, the figure obtained by copying the called part may be magnified as many times as the called-figure count, as depicted in FIG. 1003. Alternatively, the resulting figure may also be made equal through suitable arrangements to the original figure, as illustrated in FIG. 1002.

The following description explains how to modify, when multiple figures are made to overlap with one another, the uppermost figure on display relative to the size and shape of the other(s) underneath. These figures are generated by retrieval using a structure line, by retrieval using keywords, or by input of ordinary figures. In such a case, the top figure is called an overlapping figure, and the figure underneath an original figure.

Figure 11A:
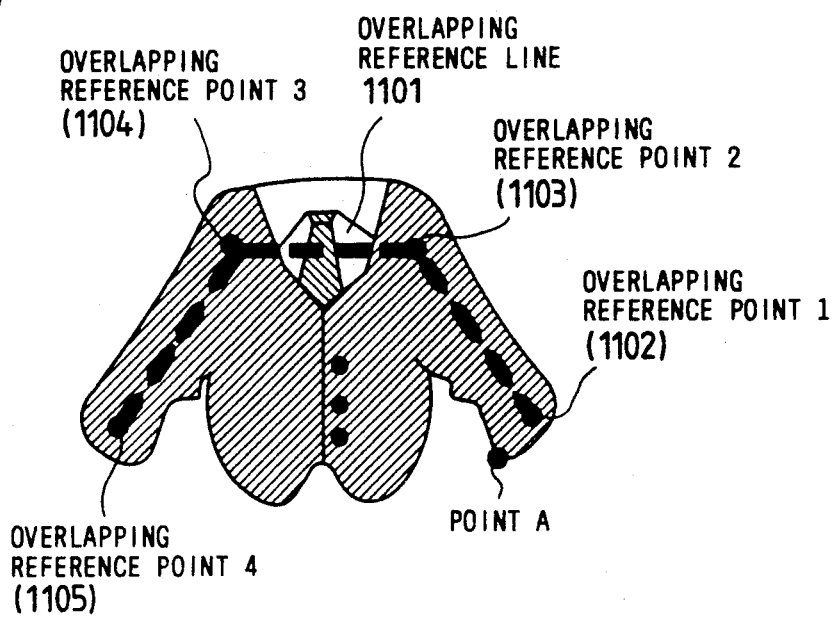
FIG. 11(a) is a view for explaining an overlapping reference line as it is used in the embodiment.
Figure 11B:
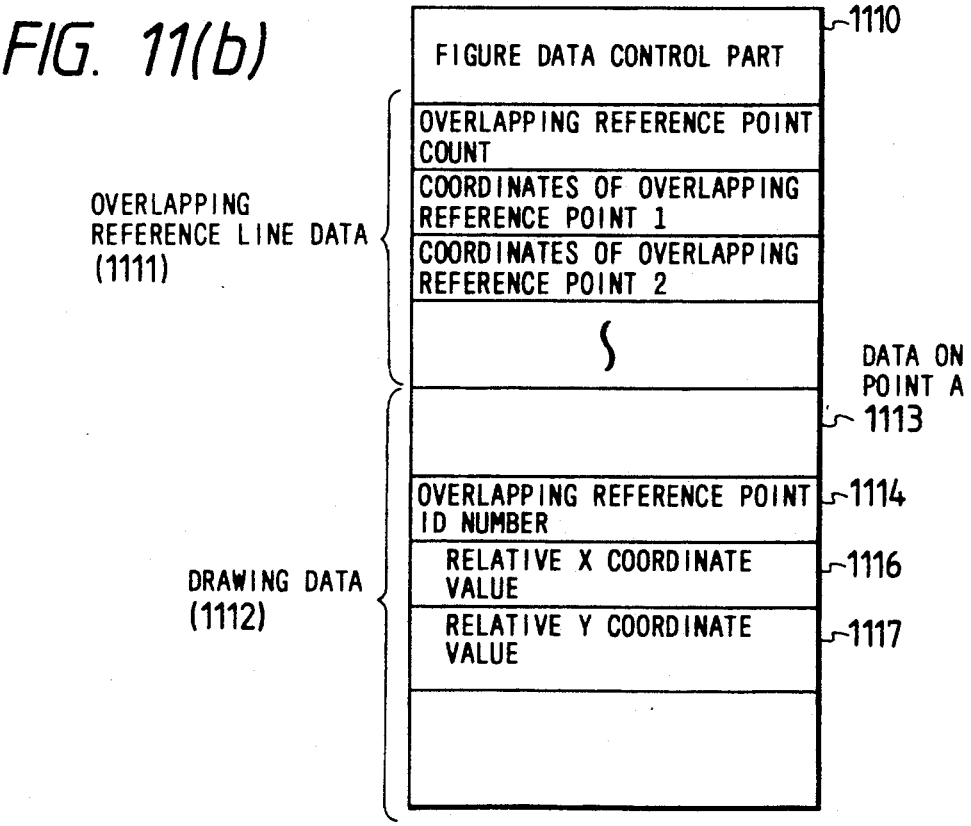
FIG. 11(b) shows the figure data that allows for modification of an overlapping figure.
Figure 12:
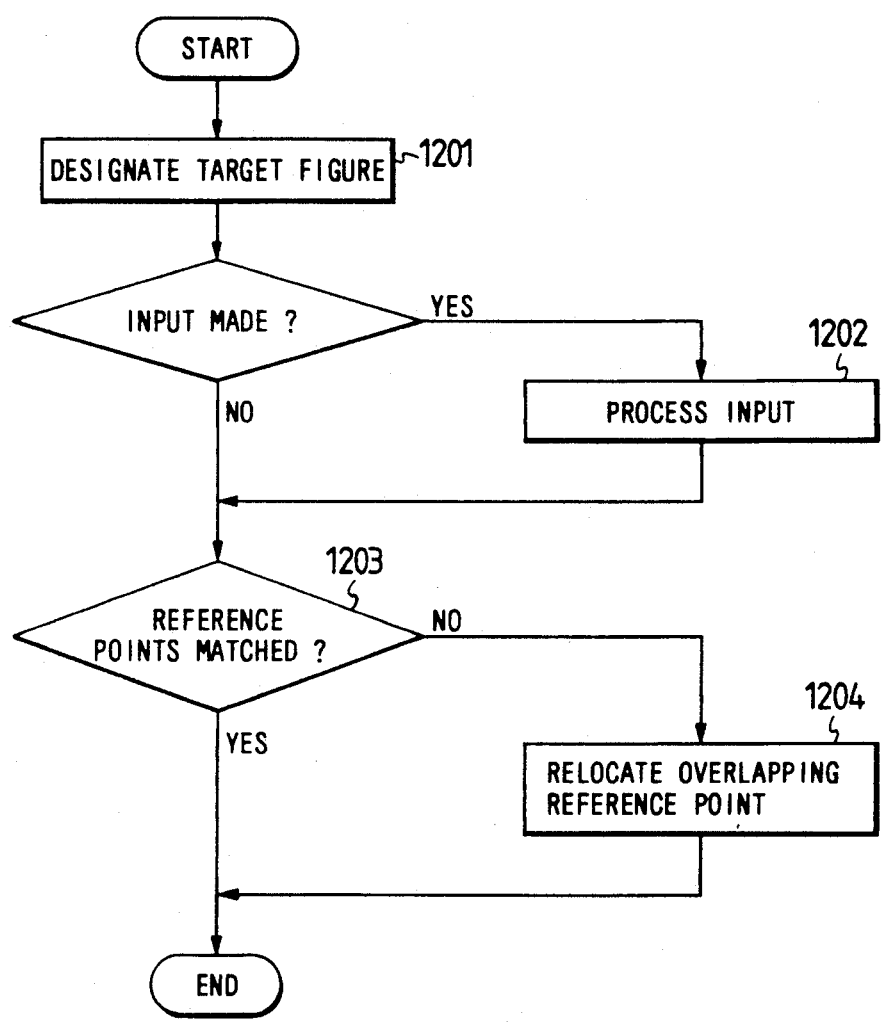
FIG. 12 is a flowchart depicting the steps to modify an overlapping figure during the modifying process.

FIGS. 11 and 12 illustrate how an overlapping figure is to be modified. As shown in FIG. 11(a), the overlapping figure is represented primarily by adding the data on an overlapping reference line to the drawing data for each figure. The resulting data is a body of data formed by overlapping drawing data based on the reference line. An overlapping reference line 1101 is formed by multiple straight lines. Intersection points made by these lines are made to overlap with one another to form reference points 1102 through 1105. Each overlapping reference point is given a unique ID number.

FIG. 11(b) depicts the configuration of figure data in effect when the overlapping figure is to be modified. The figure data in this case comprises: a figure data control part 1110 which stores the figure type, data length and other relevant parameters; an overlapping reference line data part 1111 storing data on the overlapping reference line; and an overlapping reference line data part 1112 storing drawing data. The data on the overlapping reference line contains coordinates for each overlapping reference point. The drawing data includes such data as coordinates, figure size, line type, painting pattern and other parameters needed to draw the figure. The coordinate data includes the ID number for the overlapping reference point closest to the point to be drawn, along with coordinates relative to that overlapping reference point. In FIG. 11(*b*), coordinates 1113 stored for drawing point A are represented by what is stored in an overlapping reference point ID number area 1114 for overlapping reference point 1 (1102), and by X and Y coordinate values 1115 and 1116 relative to the overlapping reference point.

FIG. 12 is a flowchart showing the steps to modify an overlapping figure. In step 1201 (for target figure designation), an original figure and an overlapping figure are designated. These figures may have been entered in advance, or may be input immediately after step 1201. In step 1202 (for input processing), the initial figure and the overlapping figure are input. Step 1202 is not carried out in the case of editing.

In step 1203 (for overlapping reference point comparison), the original figure is compared with the overlapping figure in reference point coordinates. If the coordinates fail to match, the overlapping reference points of the overlapping figure are relocated in step 1204 (for overlapping reference point relocation), until the reference points align with the overlapping reference line of the original figure. Using the above-described procedure, the user can modify the overlapping figure in accordance with the original figure without altering the drawing data for the overlapping figure.

In the procedure above, the original figure may be a structure line and the overlapping figure may be a figure of a person. In such a case, the figure of one person may be made to overlap with the structure line of diverse kinds for modification. This makes it possible to modify the figure of the person without searching for parts. In another example, the original figure may be a figure of a person and the overlapping figure may be a figure of the clothes for that person to wear. In this case, the figure of the clothes can be modified at will in keeping with the data on the wearer, i.e., the person. This arrangement reduces the number of the parts involved.

Figure 13A:
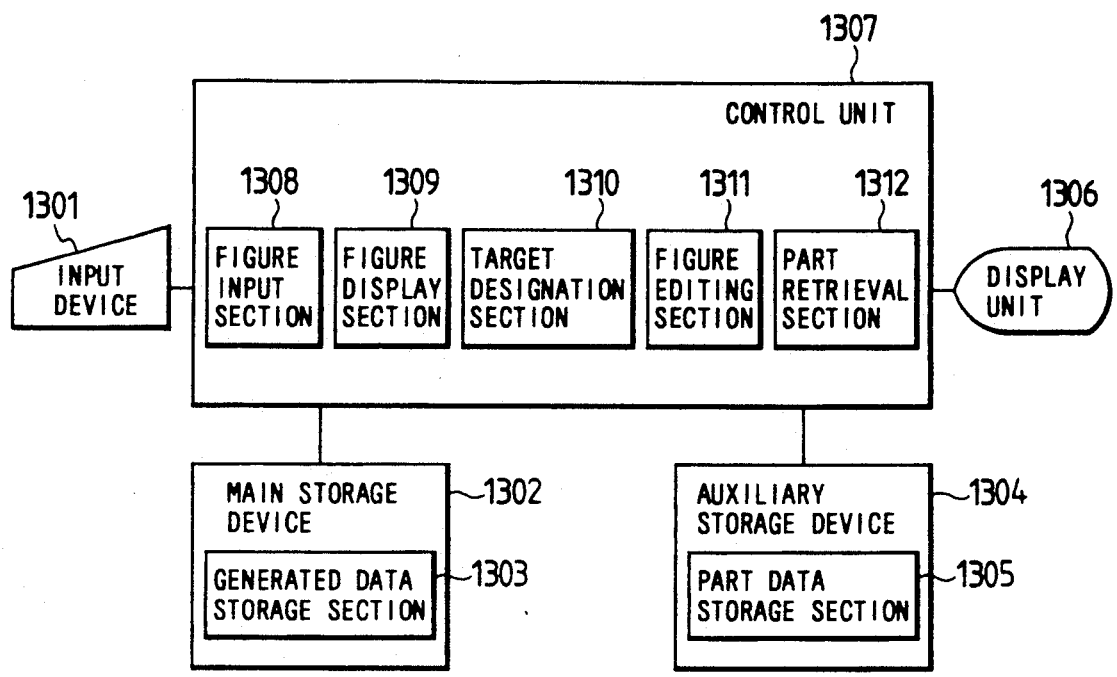
FIG. 13(a) shows the hardware configuration adapted to embody the present invention.
Figure 13B:
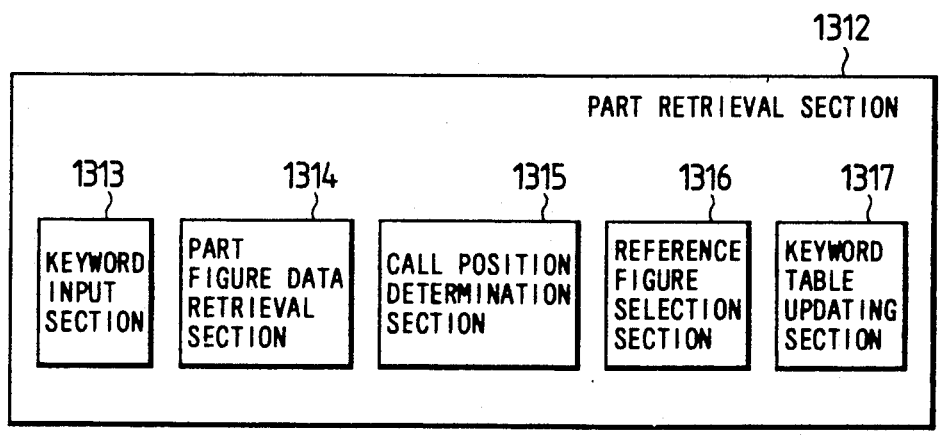
FIG. 13(b) shows in detail the part retrieval section of the embodiment.

Lastly, the hardware configuration of the preferred embodiment of the present invention will now be described. FIG. 13(*a*) depicts the system configuration of the embodiment. The hardware adapted to embody the invention comprises: an input device 1301 such as a keyboard for entering character strings and figures; a main storage device 1302 and an auxiliary storage device 1304 for storing the character codes of characters that have been input; a display unit 1306 such as a CRT display for displaying character strings and graphic representations; and a control unit 1307 for controlling the above-mentioned hardware components.

The main storage device 1302 contains a generated data storage section 1303 that stores the graphic data generated in the embodiment of the invention. The auxiliary storage device 1304 contains a part data storage section 1305 that stores sets of part figure data. This arrangement provides advantages in that the generated data storage section 1303 is separated from the part data storage section 1305. When the contents of the part data storage section 1305 are suitably switched in the auxiliary storage device 1304, the number of the part types stored may be increased substantially.

The control unit 1307 comprises five sections; A figure input section 1308, a figure display section 1309, a target designation section 1310, a figure editing section 1311, and a part retrieval section 1312. Generally, a general-purpose central processing unit (CPU) is used to assume the functions of the control unit 1307. The sections 1308 through 1313 may be programs that run under the CPU.

While controlling the input device 1301, the figure input section 1305 accepts the input of a figure and stores the input data into the generated data storage section 1303. The figure display section 1309 displays the figure on the display unit 1306 in accordance with the data entered via the input device 1301. When a portion of the figure displayed by the figure display section 1309 is designated through the input device 1301, the target designation section 1310 finds the corresponding figure from among the data stored in the generated data storage section 1303. Once the figure is obtained by the target designation section 1310, the figure editing section 1311 puts the figure to such editing operations as relocation and copying.

The part retrieval section 1312 searches the part data in the part data storage section 1305 for a figure that fits the data entered through the input device 1301. FIG. 13(*b*) illustrates the part retrieval section 1312 in detail. The part retrieval section 1312 comprises five subordinate sections: a keyword input section 1313 that accepts keywords entered through the input device 1301 and analyzes them by operating on the keyword conversion table shown in FIG. 9; a part data retrieval section 1314 that searches the part data storage section 1305 for a target part; a call position determination section 1315 that calls the retrieved part into the generated data storage section 1303 to determine its position; a reference figure selection section 1316 that selects the reference figure by which to determine the call position; and a keyword table updating section 1317 that updates the contents of the keyword conversion table. As in the case of implementing the control unit, these five sections may be realized as programs that run under the CPU 1307.

According to the present invention, it is possible to generate free curve figures easily by simply combining part figures previously stored in the auxiliary storage device. There is no need for the user to enter new figures in order to generate such figures. The use of a structure line as a reference figure for locating parts makes it possible to retrieve parts that are optimally suited for the target figure. In addition, the operating burdens on the operator are alleviated by a number of advantageous features. One is that keywords are entered through a keyboard in a format close to natural language and are later converted to system-compatible counterparts. Another feature is that overlapping figures can be modified as desired on the screen.

While we have shown and described several embodiments in accordance with the present invention, it is understood that the same is not limited thereto but is susceptible to numerous changes and modifications as known to one of ordinary skill in the art, and we therefore do not wish to be limited to the details shown and described herein but intend to cover all such modifications as are encompassed by the scope of the appended claims.

What is claimed is:

1. A graphic generating apparatus comprising:
   means for storing at least a plurality of reference figures having a plurality of positions;
   means for storing a plurality of figure parts;
   means for selecting one of the stored reference figures and for displaying the selected one of the reference figures;
   means for selecting at least one of the plurality of figure parts; and
   means responsive to the selected at least one of the plurality of figure parts and the selected one of the reference figures for aligning the selected at least one of the plurality of figure parts at at least a predetermined one of the plurality of positions on the selected one of the reference figures;
   wherein at least one of the plurality of reference figures comprises a structure line representing the skeleton of a human body.

2. A graphic generating apparatus according to claim 1, wherein the aligning means includes means for varying the size of the selected at least one of the plurality of figure parts in accordance with the size of the selected one of the reference figures.

3. A graphic generating apparatus according to claim 1, wherein the aligning means includes means for varying the size of the selected one of the reference figures in accordance with the size of the selected at least one of the plurality of figure parts.

4. A graphic generating apparatus according to claim 1, further comprising means for displaying the plurality of reference figures and the plurality of figure parts for enabling selection therefrom.

5. A graphic generating apparatus according to claim 4, wherein the display means includes first and second portions, one portion for displaying generated figures, and the other portion displaying the plurality of figure parts to be selected.

6. A graphic generating apparatus according to claim 4, wherein means are provided for designating a component of the selected reference figure, and the selecting means for the plurality of figure parts selects a figure part corresponding to the component and enables display in a generated figure display portion of the display means.

7. A graphic generating apparatus according to claim 6, further comprising separate storage means for storing a generated reference figure and for storing figure parts to be positioned with respect to the reference figure.

8. A graphic generating apparatus according to claim 7, further comprising means for storing a keyword corresponding to data of figure part storage means, the keyword storing means being responsive to the keyword for enabling search and retrieval of the corresponding figure part.

9. A graphic generating apparatus according to claim 8, wherein when the keyword is a number, figure parts corresponding to the number are retrieved and displayed.

10. An apparatus according to claim 8, further comprising means for converting a keyword into another keyword for data retrieval.

11. A graphics generating apparatus according to claim 10, wherein the converting means converts the keyword into a number for enabling figures corresponding to the number to be retrieved and displayed.

12. A graphic generating apparatus according to claim 1, wherein different ones of the plurality of figure parts are positionable at different predetermined positions on the selected one of the plurality of reference figures, the aligning means aligning selected different ones of the plurality of figure parts at the respective predetermined positions therefor.

13. A graphic generating apparatus according to claim 1, wherein when the structure line representing the skelton of the human body is selected, the plurality of figure parts relating to the plurality of positions along the structure line are simultaneously called up.

14. A graphic generating apparatus according to claim 1, wherein the plurality of reference figures include at least two different structure lines representing the skeleton of a human body having different action forms.

15. A method for generating figures comprising the steps of:
   storing at least a plurality of reference figures having a plurality of positions;
   storing a plurality of figure parts;
   selecting one of the stored reference figures and displaying the selected one of the reference figures;
   selecting at least one of the plurality of figure parts; and
   aligning the selected at least one of the plurality of figure parts at at least a predetermined one of the plurality of positions on the selected one of the reference figures and displaying the at least one selected figure part thereon;
   wherein at least one of the plurality of reference figures comprises a structure line representing the skeleton of a living being.

16. A method according to claim 15, further comprising the step of varying the size of the selected at least one of the plurality of figure parts in accordance with the size of the selected one of the reference figures.

17. A method according to claim 15, further comprising the step of varying the size of the selected one of the reference figures in accordance with the size of the selected at least one of the plurality of figure parts.

18. A method according to claim 15, further comprising the step of displaying a plurality of reference figures and the plurality of figure parts and for enabling selection therefrom.

19. A method according to claim 15, wherein different ones of the plurality of figure parts are positionable at different predetermined ones of the plurality of positions on the selected one of the plurality of reference figures, and further comprising the step of positioning selected different ones of the plurality of figure parts at the respective predetermined positions therefor.

20. A method according to claim 15, wherein the plurality of reference figures include at least two different structure lines representing the skeleton of a living being having different action forms.

21. A method according to claim 20, wherein the living being is a human body.

22. A method according to claim 15, wherein the living body is a human body.

23. A graphic generating apparatus comprising:
   means for storing at least a plurality of reference figures having a plurality of positions;
   means for storing a plurality of figure parts;
   means for selecting one of the stored reference figures and for displaying the selected one of the reference figures;
   means for selecting at least one of the plurality of figure parts; and means responsive to the selected at least one of the plurality of figure parts and the selected one of the reference figures for aligning the selected at least one of the plurality of figure parts at at least a predetermined one of the plurality of positions on the selected one of the reference figures;

wherein at least one of the plurality of reference figures comprises a structure line representing the skeleton of a living being.

24. A graphic generating apparatus according to claim 23, wherein the plurality of reference figures include at least two different structure lines representing the skeleton of a living being having different action forms.

25. A graphic generating apparatus according to claim 23, wherein when the structure line representing the skeleton of the human body is selected, the plurality of figure parts relating to the plurality of positions along the structure line are simultaneously called up.

26. A graphic generating apparatus according to claim 23, wherein the aligning means includes means for varying the size of the selected at least one of the plurality of figure parts in accordance with the size of the selected one of the reference figures.

27. A graphic generating apparatus according to claim 23, wherein the aligning means includes means for varying the size of the selected one of the reference figures in accordance with the size of the selected at least one of the plurality of figure parts.

28. A graphic generating apparatus according to claim 23, further comprising means for displaying the plurality of reference figures and the plurality of figure parts for enabling selection therefrom.

29. A graphic generating apparatus according to claim 28, wherein the display means includes first and second portions, one portion for displaying generated figures, and the other portion displaying the plurality of figure parts to be selected.

30. A graphic generating apparatus according to claim 28, wherein means are provided for designating a component of the selected reference figure, and the selecting means for the plurality of figure parts selects a figure part corresponding to the component and enables display in a generated figure display portion of the display means.

31. A graphic generating apparatus according to claim 30, further comprising separate storage means for storing a generated reference figure and for storing figure parts to be positioned with respect to the reference figure.

32. A graphic generating apparatus according to claim 31, further comprising means for storing a keyword corresponding to data of figure part storage means, the keyword storing means being responsive to the keyword for enabling search and retrieval of the corresponding figure part.

33. A graphic generating apparatus according to claim 32, wherein the keyword is a number, figure parts corresponding to the number are retrieved and displayed.

34. An apparatus according to claim 32, further comprising means for converting a keyword into another keyword for data retrieval.

35. A graphic generating apparatus according to claim 34, wherein the converting means converts the keyword into a number for enabling figures corresponding to the number to be retrieved and displayed.

36. A graphic generating apparatus according to claim 23, wherein different ones of the plurality of figure parts are positionable at different predetermined positions on the selected one of the plurality of reference figures, the aligning means aligning selected different ones of the plurality of figure parts at the respective predetermined positions therefor.

* * * * *